(12) United States Patent
Kubo et al.

(10) Patent No.: US 10,907,542 B2
(45) Date of Patent: Feb. 2, 2021

(54) COMPRESSED AIR ENERGY STORAGE POWER GENERATION DEVICE

(71) Applicant: KOBE STEEL, LTD., Hyogo (JP)

(72) Inventors: Yohei Kubo, Kobe (JP); Masaki Matsukuma, Takasago (JP); Yuji Matsuo, Takasago (JP); Takashi Sato, Takasago (JP); Ryo Nakamichi, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 16/495,476

(22) PCT Filed: Mar. 15, 2018

(86) PCT No.: PCT/JP2018/010314
§ 371 (c)(1),
(2) Date: Sep. 19, 2019

(87) PCT Pub. No.: WO2018/193768
PCT Pub. Date: Oct. 25, 2018

(65) Prior Publication Data
US 2020/0088095 A1 Mar. 19, 2020

(30) Foreign Application Priority Data
Apr. 21, 2017 (JP) .................................. 2017-084716

(51) Int. Cl.
*F02C 6/16* (2006.01)
*F02C 1/04* (2006.01)
(Continued)

(52) U.S. Cl.
CPC .................. *F02C 6/16* (2013.01); *F02C 1/04* (2013.01); *F28D 20/0034* (2013.01);
(Continued)

(58) Field of Classification Search
CPC .... F02C 6/16; F02C 1/04; F02C 7/143; H02J 15/006; F03D 9/17; F05D 2260/42;
(Continued)

(56) References Cited

U.S. PATENT DOCUMENTS

2010/0251712 A1* 10/2010 Nakhamkin .............. F02C 6/16
60/659
2011/0100010 A1 5/2011 Freund et al.
(Continued)

FOREIGN PATENT DOCUMENTS

JP        S63-277436 A     11/1988
JP        2012-097737 A    5/2012
(Continued)

OTHER PUBLICATIONS

International Preliminary Report on Patentability issued in corresponding International Application No. PCT/JP2018/010314; dated Oct. 31, 2019.

*Primary Examiner* — Shafiq Mian
*Assistant Examiner* — Xiaoting Hu
(74) *Attorney, Agent, or Firm* — Studebaker & Brackett PC

(57) ABSTRACT

A compressor, a first heat exchanger, a first heat storage unit, a pressure accumulation unit, a second heat exchanger, and a second heat storage unit are provided. The first heat storage unit and the second heat storage unit are connected by a first flow passage and a second flow passage. The first and second flow passages are connected by a third flow passage. A first on-off means is provided in a first region of the first flow passage and a second on-off means is provided in a second region. A third on-off means is provided in a third region of the second flow passage, and a fourth on-off means is provided in a fourth region. A driving means and a heating means are provided in the third flow passage.

4 Claims, 6 Drawing Sheets

(51) Int. Cl.
*F28D 20/00* (2006.01)
*F03D 9/17* (2016.01)
*H02J 15/00* (2006.01)
*F02C 7/143* (2006.01)

(52) U.S. Cl.
CPC ............... *F02C 7/143* (2013.01); *F03D 9/17* (2016.05); *F05D 2260/211* (2013.01); *F05D 2260/213* (2013.01); *F05D 2260/42* (2013.01); *H02J 15/006* (2013.01)

(58) Field of Classification Search
CPC ......... F05D 2260/211; F05D 2260/213; F28D 20/0034; F28D 20/0047; F28D 2020/0082
See application file for complete search history.

(56) References Cited

U.S. PATENT DOCUMENTS

| | | | | |
|---|---|---|---|---|
| 2012/0102937 A1* | 5/2012 | Anikhindi | ................ | F02C 1/04 60/413 |
| 2014/0020369 A1* | 1/2014 | Guidati | .................... | F02C 6/16 60/327 |
| 2015/0000248 A1* | 1/2015 | del Omo | ................ | F01K 23/10 60/39.182 |
| 2017/0284336 A1* | 10/2017 | Sakamoto | ................. | F02C 7/10 |
| 2018/0128167 A1* | 5/2018 | Matsukuma | .............. | F02C 1/05 |
| 2018/0156110 A1* | 6/2018 | Matsukuma | .............. | F02C 6/16 |
| 2018/0171832 A1* | 6/2018 | Kubo | ...................... | F28D 20/00 |
| 2018/0266315 A1 | 9/2018 | Kubo et al. | | |
| 2018/0313267 A1* | 11/2018 | Sato | .......................... | F02C 9/16 |
| 2018/0347459 A1* | 12/2018 | Matsukuma | .............. | F02C 7/16 |
| 2019/0170026 A1* | 6/2019 | Matsukuma | .............. | F02C 1/04 |

FOREIGN PATENT DOCUMENTS

| | | | |
|---|---|---|---|
| JP | 2013509530 A | 3/2013 | |
| JP | 2016121675 A | 7/2016 | |
| JP | 2016-211464 A | 12/2016 | |
| WO | WO-2010125568 A2 * | 11/2010 | ............... F03D 9/28 |

* cited by examiner

COMPRESSED AIR ENERGY STORAGE POWER GENERATION DEVICE

CROSS-REFERENCE TO RELATED APPLICATIONS

This is a national phase application in the United States of International Patent Application No. PCT/JP2018/010314 with an international filing date of Mar. 15, 2018, which claims priority of Japanese Patent Application No. 2017-084716 filed on Apr. 21, 2017, the contents of which are incorporated herein by reference.

TECHNICAL FIELD

The present disclosure relates to a compressed air energy storage power generation device.

BACKGROUND ART

Since power generation using renewable energy such as wind power generation and photovoltaic power generation depends on weather conditions, the output fluctuates and is not stabilized in some cases. Against such output fluctuations, a compressed air energy storage (CAES) system is known to serve as a system for leveling the output.

For example, JP 2016-121675 A discloses a CAES power generation device using a heat energy storage system.

However, in the CAES power generator disclosed in JP 2016-121675 A, no countermeasure is taken against the problem caused by lowering the temperature of the heat medium to increase viscosity.

PRIOR ART DOCUMENT

Patent Document

Patent Document 1: JP 2016-121675 A

SUMMARY OT THE INVENTION

Problems to be Solved by the Invention

An aspect of the present invention has an object to provide a compressed air energy storage power generation device capable of effectively preventing the temperature decrease in the heat medium to stabilize the fluid state of the heating medium.

Means for Solving the Problems

As means for solving the problem, one aspect of the present invention provides a compressed air energy storage power generation device including:

a compressor that compresses air;

a pressure accumulation unit that stores compressed air compressed by the compressor;

an expander driven by compressed air supplied from the pressure accumulation unit;

a generator mechanically connected to the expander;

a first heat exchanger that conducts heat exchange between a heating medium and the compressed air supplied from the compressor to the pressure accumulation unit so as to cool compressed air and heat a heating medium;

a first heat storage unit that stores the heating medium heated by the first heat exchanger;

a second heat exchanger that conducts heat exchange between the compressed air supplied from the pressure accumulation unit to the expander and the heating medium supplied from the first heat storage unit so as to heat compressed air and cool a heating medium;

a second heat storage unit that stores the heating medium cooled by the second heat exchanger to supply the heating medium to the first heat exchanger;

a first heating medium flow passage and a second heating medium flow passage that connects the first heat storage unit and the second heat storage unit;

a third heating medium flow passage that connects an intermediate portion of the first heating medium flow passage and an intermediate portion of the second heating medium flow passage;

a first on-off means that opens and closes the first heating medium flow passage at a first region extending from the first heat storage unit to the third heating medium flow passage;

a second on-off means that opens and closes the first heating medium flow passage at a second region extending from the second heat storage unit to the third heating medium flow passage;

a third on-off means that opens and closes the second heating medium flow passage at a third region extending from the first heat storage unit to the third heating medium flow passage;

a fourth on-off means that opens and closes the second heating medium flow passage at a fourth region extending from the second heat storage unit to the third heating medium flow passage;

a driving means that is provided in the third heating medium flow passage, and flows the heating medium; and a heating means that is provided in the third heating medium flow passage, and heats the heating medium passing therethrough.

With this configuration, the heating medium can be switched to a first flow which opens the second on-off means and the third on-off means and closes the first on-off means and the fourth on-off means, and a second flow which closes the first on-off means and the third on-off means and opens the second on-off means and the fourth on-off means. In addition, the heating medium can be switched to a third flow which opens the first on-off means and the third on-off means and closes the second on-off means and the fourth on-off means, and a fourth flow which opens the first on-off means and the fourth on-off means and closes the second on-off means and the third on-off means. As a result, in the warm-up operation, the heat medium can be prevented from being in a high viscosity state with a low temperature, and the fluid state can be stabilized.

It is preferred that the compressed air energy storage power generation device further includes:

a first temperature detection means that detects a temperature of the heating medium stored in the first heat storage unit;

a second temperature detection means that detects a temperature of the heating medium stored in the second heat storage unit;

a volume detection means that detects a volume of the heating medium stored in the first heat storage unit; and a control means, wherein under a condition where a detected temperature by the second temperature detection means is not more than a second set temperature, when a volume of the heating medium detected by the volume detection means is not less than a set volume, and a temperature of the heating medium detected by the first temperature detection means is not less than a first set temperature, the control means opens the second on-off means and the third on-off means, closes the first on-off means and the fourth on-off means, and drives the driving means, thereby supplying the heating medium stored in the first heat storage unit to the second heat storage unit, and when the volume of a heating medium detected by the volume detection means is less than the set volume, or the temperature of a heating medium detected by the first temperature detection means is less than the first set temperature, the control means closes the first on-off means and the third on-off means, opens the second on-off means and the fourth on-off means, heats a heating medium by the heating means, and drives the driving means, thereby circulating the heating medium stored in the second heat storage unit.

With this configuration, when the volume of the heating medium stored in the first heat storage unit is sufficient and the temperature is high, the heating medium can be used to raise the temperature of the heating medium in the second heat storage unit. In addition, when these conditions are not satisfied, it is possible to heat the heating medium stored in the second heat storage unit while circulating the heating medium. Thus, it is possible to end the warm-up operation early and shift to the normal operation.

It is preferred that the compressed air energy storage power generation device further includes:

a first temperature detection means that detects a temperature of a heating medium stored in the first heat storage unit;

a volume detection means that detects a volume of a heating medium stored in the first heat storage unit; and a control means, wherein, under a condition where a detected temperature in the first temperature detection means is not more than a first set temperature, the control means determines whether a detected volume by the volume detection means is not less than a set volume, when the control means determines that the detected volume by the volume detection means is not less than a set volume, the control means opens the first on-off means and the third on-off means, closes the second on-off means and the fourth on-off means, heats the heating medium by the heating means, and drives the driving means, thereby circulating the heating medium stored in the first heat storage unit, and when the control means determines that the detected volume by the volume detection means is less than the set volume, the control means opens the first on-off means and the fourth on-off means, closes the second on-off means and the third on-off means, heats the heating medium by the heating means, and drives the driving means, thereby supplying the heating medium stored in the second heat storage unit to the first heat storage unit.

With this configuration, if the volume of the heating medium stored in the first heat storage unit is sufficient, even if the temperature is low, the heating medium can be heated and used to raise the temperature of the compressed air. In addition, even if the volume of the heating medium stored in the first heat storage unit is insufficient, the heating medium can be similarly used to raise the temperature of the compressed air by supplying and heating from the second heat storage unit.

It is preferred that the compressed air energy storage power generation device further includes:

a second temperature detection means that detects a temperature of the heating medium stored in the second heat storage unit;

a cooling means provided in a heating medium flow passage from the second heat storage unit to the compressor, a bypass flow passage that bypasses the cooling means; and a control means, wherein when a detected temperature by the second temperature detection means is not less than a third set temperature, the control means causes the cooling means to cool the heating medium stored in the second heat storage unit, and when the detected temperature by the second temperature detection means is less than the third set temperature, the control means supplies the heating medium stored in the second heat storage unit via the bypass flow passage that bypasses the cooling means.

With this configuration, the temperature of the heating medium supplied to the heat exchanger can be easily adjusted to a desired value.

According to one aspect of the invention, regarding the flow form of the heating medium between the first heat storage unit and the second heat storage unit, just by changing the on-off state of each on-off means, the temperature of the heating medium can be controlled appropriately to stabilize the fluid state.

DESCRIPTION OF EMBODIMENTS

Hereinafter, an embodiment according to the present invention will be described with reference to the accompanying drawings. It should be noted that the following description is, fundamentally, merely illustrative and is not intended to limit the present invention, products to which the present invention is applied, or applications of the present invention. In addition, the drawings are schematic, and the ratio and the like of each dimension are different from actual ones.

Figure 1:
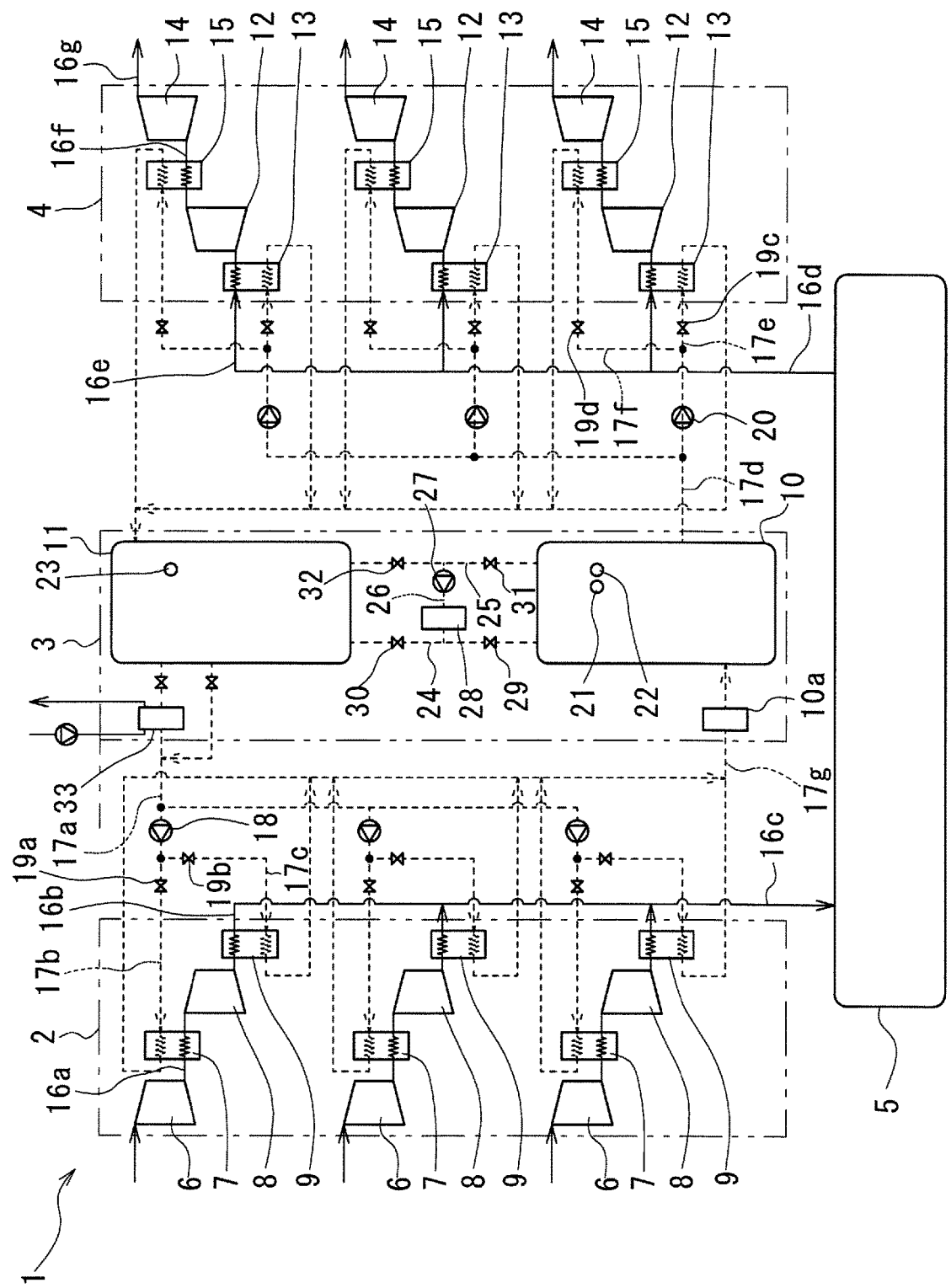
FIG. 1 is a schematic block diagram showing a CAES power generation device according to the present embodiment.

FIG. 1 is a schematic block diagram showing a CAES power generation device 1. The CAES power generation device 1 includes a charging unit 2, a heating medium unit 3, a discharge unit 4, and a pressure accumulation tank 5. The charging unit 2 includes a first compressor 6, a first heat exchanger 7, a second compressor 8, and a second heat exchanger 9. The heating medium unit 3 includes a first heat storage tank 10 and a second heat storage tank 11. The discharge unit 4 includes a first expander 12, a third heat exchanger 13, a second expander 14, and a fourth heat exchanger 15. In addition, the CAES power generation device 1 can be grasped from the flows of air and heating medium by being divided into air flow passages 16a to 16g (indicated by solid lines) and heating medium flow passages 17 to 17g (indicated by alternate long and short dashed lines). Hereinafter, the CAES power generation device 1 will be described by being divided into members related to the air flow passages 16a to 16g and members related to the heating medium flow passages 17a to 17g.

(Air Flow Passage)

The air flow passages 16a to 16g are provided with the first compressor 6, the first heat exchanger 7, the second compressor 8, the second heat exchanger 9, the pressure accumulation tank 5, the third heat exchanger 13, the first expander 12, the fourth heat exchanger 15, and the second expander 14 from the upstream side to the downstream side of the air flow in this order. The first compressor 6, the first heat exchanger 7, the second compressor 8, and the second heat exchanger 9 are connected in series as one set, and three sets are provided in parallel. The third heat exchanger 13, the first expander 12, the fourth heat exchanger 15, and the second expander 14 are also connected in series as one set, and three sets are provided in parallel.

The first compressor 6 and the second compressor 8 are driven by a motor (not shown) to take in air from the intake port, compress the air inside, and discharge the air as compressed air from the discharge port. The discharge port of the first compressor 6 is connected to the suction port of the second compressor 8 via the air flow passage 16a. An air flow passage 16b is connected to the discharge port of the second compressor 8. The air flow passage 16b extending from each second compressor 8 is connected to the pressure accumulation tank 5 via a common air flow passage 16c. It should be noted that for the first compressor 6 and the second compressor 8, for example, those of various types such as a screw type, a scroll type, a turbo type, and a reciprocating type can be used.

The first heat exchanger 7 and the second heat exchanger 9 cool the compressed air compressed by the first compressor 6 and the second compressor 8 with the heating medium from the second heat storage tank 11 described below. Here, two-stage cooling of cooling the compressed air from the first compressor 6 with the first heat exchanger 7, and then furthermore, cooling the compressed air passing through the second compressor 8 with the second heat exchanger 9 is performed. Cooling the compressed air increases the density of the compressed air storable in the first heat storage tank 10 described below and reduces the loss of thermal energy due to the heat radiation during storage.

The pressure accumulation tank 5 stores compressed air as energy. The pressure accumulation tank 5 is connected to a corresponding one of air supply ports of each of the first expanders 12 via the individual air flow passage 16e from the common air flow passage 16d. The compressed air delivered from the pressure accumulation tank 5 is supplied to each of the first expanders 12 via the air flow passages 16d and 16e.

The third heat exchanger 13 is provided in the middle of the air flow passage 16e. The fourth heat exchanger 15 is provided in the middle of the air flow passage 16f connecting the exhaust port of the first expander 12 and the air supply port of the second expander 14. The third heat exchanger 13 and the fourth heat exchanger 15 heat the compressed air delivered from the pressure accumulation tank 5 with the heating medium from the first heat storage tank 10 described below. Here, two-stage heating of heating the compressed air from the pressure accumulation tank 5 with the third heat exchanger 13, and then furthermore, heating the compressed air passing through the third heat exchanger 13 with the fourth heat exchanger 15 is performed. Heating the compressed air allows expansion by the first expander 12 and the second expander 14 to be smoothly performed, and power generation by a generator to be appropriately performed.

The first expander 12 and the second expander 14 are supplied with compressed air from the air supply ports and are operated by the supplied compressed air to drive a generator (not shown). In addition, the air expanded by the second expander 14 is exhausted from the exhaust port via the air flow passage 16g. It should be noted that for the first expander 12 and the second expander 14, for example, those of various types such as a screw type, a scroll type, a turbo type, and a reciprocating type can be used.

(Heating Medium Flow Passage)

The first heat exchanger 7 and the second heat exchanger 9, the first heat storage tank 10, the third heat exchanger 13 and the fourth heat exchanger 15, and the second heat storage tank 11 are provided in the heating medium flow passages 17a to 17g in this order in the flow direction of the heating medium flowing annularly. The first heat exchanger 7 and the second heat exchanger 9 are connected in parallel as one set, and three sets are provided in parallel. The third heat exchanger 13 and the fourth heat exchanger 15 are also connected in parallel as one set, and three sets are provided in parallel. A first pump 18 is provided in the heating medium flow passage 17a extending from the second heat storage tank 11, and on-off valves 19a and 19b are respectively provided in the heating medium flow passages 17b and 17c branched into the first heat exchanger 7 and the second heat exchanger 9. A second pump 20 is provided in the heating medium flow passage 17d extending from the first heat storage tank 10, and on-off valves 19c and 19d are respectively provided also in the heating medium flow passages 17e and 17f branched into the third heat exchanger 13 and the fourth heat exchanger 15. It should be noted that for the heating medium, those of various bases such as mineral oil base and glycol base can be used.

The first heat exchanger 7 and the second heat exchanger 9 cause the heating medium supplied from the second heat storage tank 11 by the drive of the first pump 18 to absorb heat from the compressed air compressed by the first compressor 6 and the second compressor 8. The heating medium having absorbed heat to have high temperature flows to the first heat storage tank 10.

The third heat exchanger 13 and the fourth heat exchanger 15 cause the heating medium supplied from the first heat storage tank 10 by the drive of the second pump 20 to dissipate heat into the compressed air to be supplied to the first expander 12 and the second expander 14. The heating medium having dissipated heat to have low temperature flows to the second heat storage tank 11.

Figure 2:
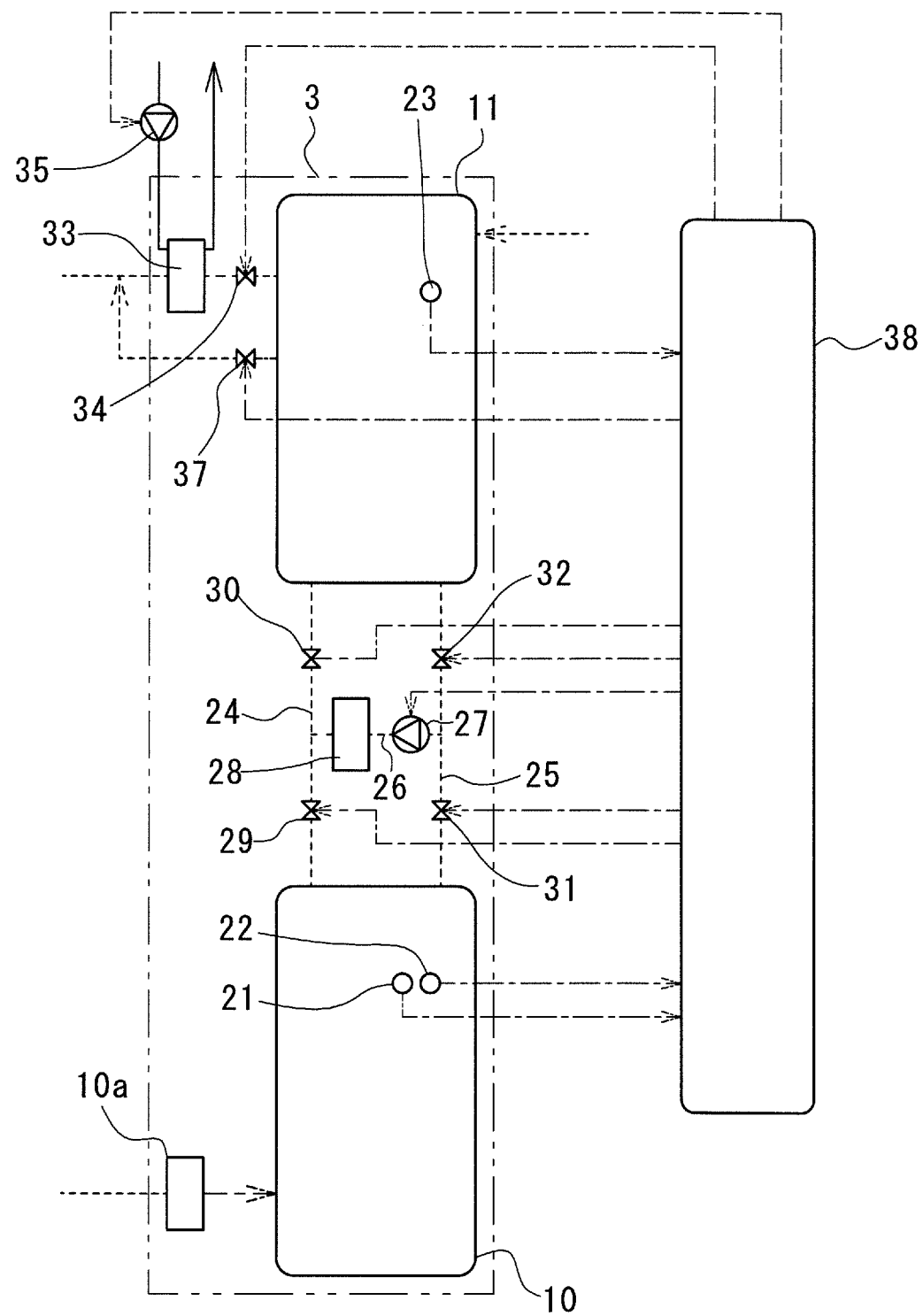
FIG. 2 is an enlarged view of a heating medium unit in FIG. 1.

The first heat storage tank 10 and the second heat storage tank 11 have a heat insulated structure. In the first heat storage tank 10, a heating medium having absorbed heat from the compressed air with the first heat exchanger 7 and the second heat exchanger 9 to have high temperature is stored. As shown in FIG. 2, a heater 10a is provided in the heating medium flow passage 17g connected in the vicinity of the inlet of the first heat storage tank 10. The heater 10a is for auxiliary heating when the temperature of the heating medium collected from the charging unit 2 does not rise so much. The first heat storage tank 10 is provided with a first temperature detection sensor 21 and a water level detection sensor 22. The temperature of the heating medium in the first heat storage tank 10 detected by the first temperature detection sensor 21 and the water level of the heating medium detected by the water level detection sensor 22 are input into the control device 38. In the second heat storage tank 11, the heating medium having dissipated heat into the compressed air by the third heat exchanger 13 and the fourth heat exchanger 15 to have low temperature is stored. The second heat storage tank 11 is provided with a second temperature detection sensor 23. The temperature of the heating medium in the second heat storage tank 11 detected by the second temperature detection sensor 23 is input into the control device 38.

The first heat storage tank 10 and the second heat storage tank 11 are connected by a first pipe 24 that constitutes a first heating medium flow passage and a second pipe 25 that constitutes a second heating medium flow passage. In addition, intermediate portions of the first pipe 24 and the second pipe 25 are connected by a third pipe 26 that constitutes a third heating medium flow passage. A third pump 27 and an electric heater 28 are provided in the middle of the third pipe 26. The heating medium passing through the electric heater 28 can be heated by the electric heater 28. In the first pipe 24, a first on-off valve 29 and a second on-off valve 30 are respectively provided on the side of the first heat storage tank 10 and the side of the second heat storage tank 11 from the connection portion with the third pipe 26. Also in the second pipe 25, a third on-off valve 31 and a fourth on-off valve 32 are respectively provided on the side of the first heat storage tank 10 and the side of the second heat storage tank 11 from the connection portion with the third pipe 26.

In the middle of the heating medium flow passage 17 before branching from the second heat storage tank 11 into three sets of the first heat exchanger 7 and the second heat exchanger 9, a cooling water cooler 33 as a cooling means and a fifth on-off valve 34 are provided. The cooling water cooler 33 is supplied with cooling water whose flow rate is controlled by the drive of the fourth pump 35, and can cool the heating medium passing therethrough. In addition, a bypass flow passage 36 bypassing the cooling water cooler 33 is connected from the second heat storage tank 11. The bypass flow passage 36 is provided with a sixth on-off valve 37. Closing any one of the fifth on-off valve 34 and the sixth on-off valve 37 and opening the other makes it possible to select any one of a first route for flowing through the heating medium flow passage 17 passing through the cooling water cooler 33 and a second route for bypassing the cooling water cooler 33 to flow.

(Control Method)

Next, the operation of the CAES power generation device 1 configured as described above will be described. Here, the control contents by the control device 38 will be mainly described. Specifically, the description will be divided into first processing of being performed in a warm-up operation and required to increase the temperature of the heating medium in the second heat storage tank 11, second processing of being required to increase the temperature of the heating medium in the first heat storage tank 10, and third processing of being performed after the start of operation and required to decrease the temperature of the heating medium in the system.

Figure 6:
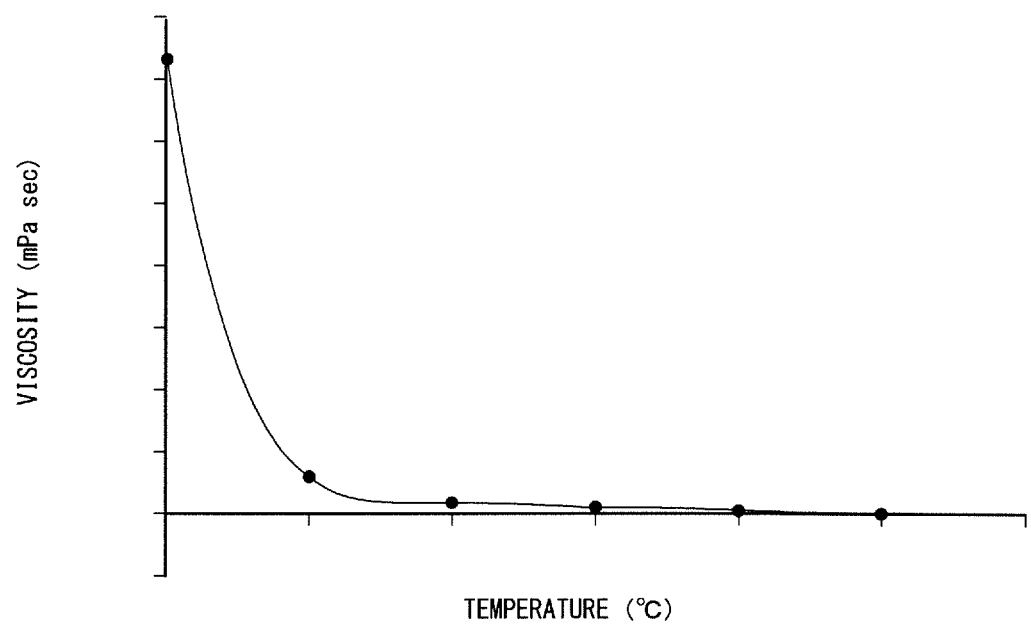
FIG. 6 is a graph showing a relationship between temperature and viscosity of a heating medium to be flown in a heating medium flow passage of a compressed air energy storage power generation device in FIG. 1.

It should be noted that the heating medium has a property that its viscosity changes depending on the temperature, and, for example, as shown in the graph in FIG. 6, the viscosity is rapidly increased when the temperature becomes a predetermined temperature (for example, 50° C.) or less. Then, when the viscosity of the heat medium increases and the fluid state deteriorates, the heat exchange performance in the second heat exchanger 7 decreases. As a result, the temperature of the compressed air to be supplied to the expander 8 cannot be sufficiently raised, and the power generation performance is degraded. In addition, when the power generation output is small, the flow rate of compressed air decreases, but even in that case, the rated flow rate must be secured so that heat exchange with the heating medium is appropriately performed, and what is called heating medium loss occurs. Thus, the following first processing and second processing are performed in order to prevent the occurrence of such a problem.

(First Processing: Step S1)

Figure 3:
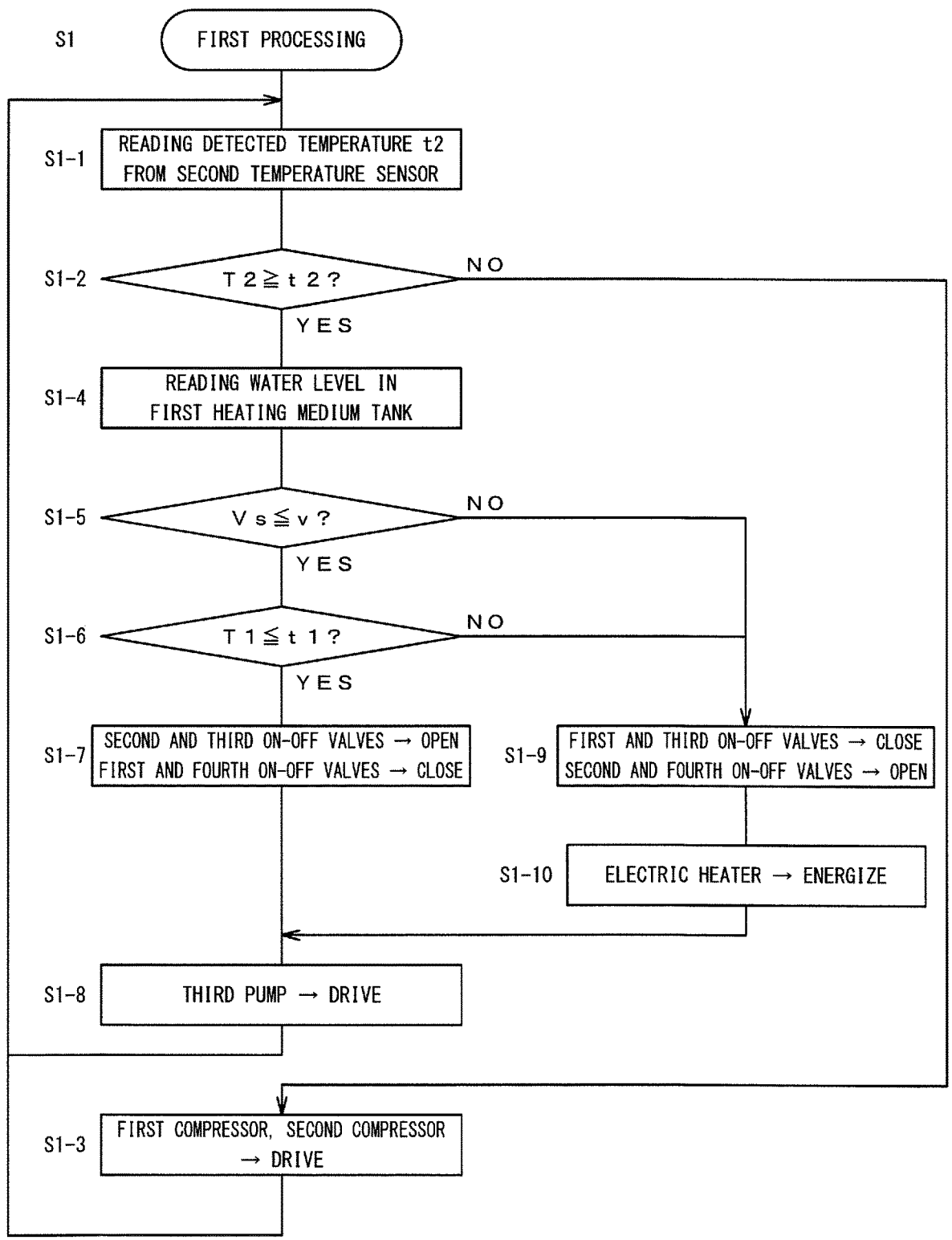
FIG. 3 is a flowchart showing first processing by a control device in FIG. 2.

As shown in FIG. 3, in the first processing, the process reads a temperature (detected temperature) t2 of the heating medium in the second heat storage tank 11 detected by the second temperature detection sensor 23 (step S1-1), and determines whether the read detected temperature t2 is not more than a preset second set temperature T2 (step S1-2). If the heating medium temperature t2 exceeds the second set temperature T2, the process supplies the heating medium in the second heat storage tank 11 as it is to the first heat exchanger 7 and the second heat exchanger 9, and starts driving of the first compressor 6 and the second compressor 8 (step S1-3). Thus, the compressed air compressed by the first compressor 6 to have high temperature is heat-exchanged with the heating medium in the first heat exchanger 7 to have low temperature. Then, the compressed air passing through the first heat exchanger 7 is further compressed by the second compressor 8 to have high temperature again, and then is heat-exchanged with the heating medium by the second heat exchanger 9 to have low temperature.

If the detected temperature t2 by the second temperature detection sensor 23 is not more than the second set temperature T2 (YES in step S1-2), the process reads the water level of the heating medium in the first heat storage tank 10 detected by the water level detection sensor 23 (step S1-4). Then, based on the read water level of the heating medium, the process determines whether a volume v of the heating medium stored in the first heat storage tank 10 is not less than a set volume Vs (step S1-5). If the volume v is not less than the set volume Vs, the process determines whether a temperature t1 of the heating medium in the first heat storage tank 10 detected by the first temperature detection sensor 21 is not less than a first set temperature T1 (step S1-6).

If the volume v of the heating medium stored in the first heat storage tank 10 is not less than the set volume Vs and the temperature t1 of the heating medium is not less than the first set temperature T1, the process opens the second on-off valve 30 and the third on-off valve 31, and closes the first on-off valve 29 and the fourth on-off valve 32 (step S1-7). Then, the process starts driving of the third pump 27 (step S1-8). In addition, the process starts driving of the first compressor 6 and the second compressor 8 (step S1-3). Thus, the high-temperature heating medium in the first heat storage tank 10 can be supplied to the second heat storage tank 11, and the heating medium in the second heat storage tank 11 can be raised in temperature. Raising the temperature of the heating medium in the second heating medium tank prevents the viscosity from increasing and secures a smooth flow.

If the volume v of the heating medium stored in the first heat storage tank 10 is less than the set volume Vs or the temperature t1 of the heating medium is less than the first set temperature T1, the process closes the first on-off valve 29 and the third on-off valve 31, and opens the second on-off valve 30 and the fourth on-off valve 32 (step S1-9). Then, the process energizes the electric heater 28 (step S1-10), and starts driving of the third pump 27 (step 81-8). If heating by the heating medium in the first heat storage tank 10 cannot be expected, circulating the heating medium in the second heat storage tank 11 to forcibly heating the heating medium by the electric heater 28 makes it possible, as described above, to prevent the viscosity from becoming high as the temperature of the heating medium decreases.

Thereafter, if the read heating medium temperature t2 exceeds the preset second temperature T2, the process starts driving of the first compressor 6 and the second compressor 8 (step S1-3). Since the flow of the heating medium is set in a good state, the load on the third pump 27 does not increase, and the distribution failure of the heating medium to each member or the like does not occur.

(Second Processing: Step S2)

Figure 4:
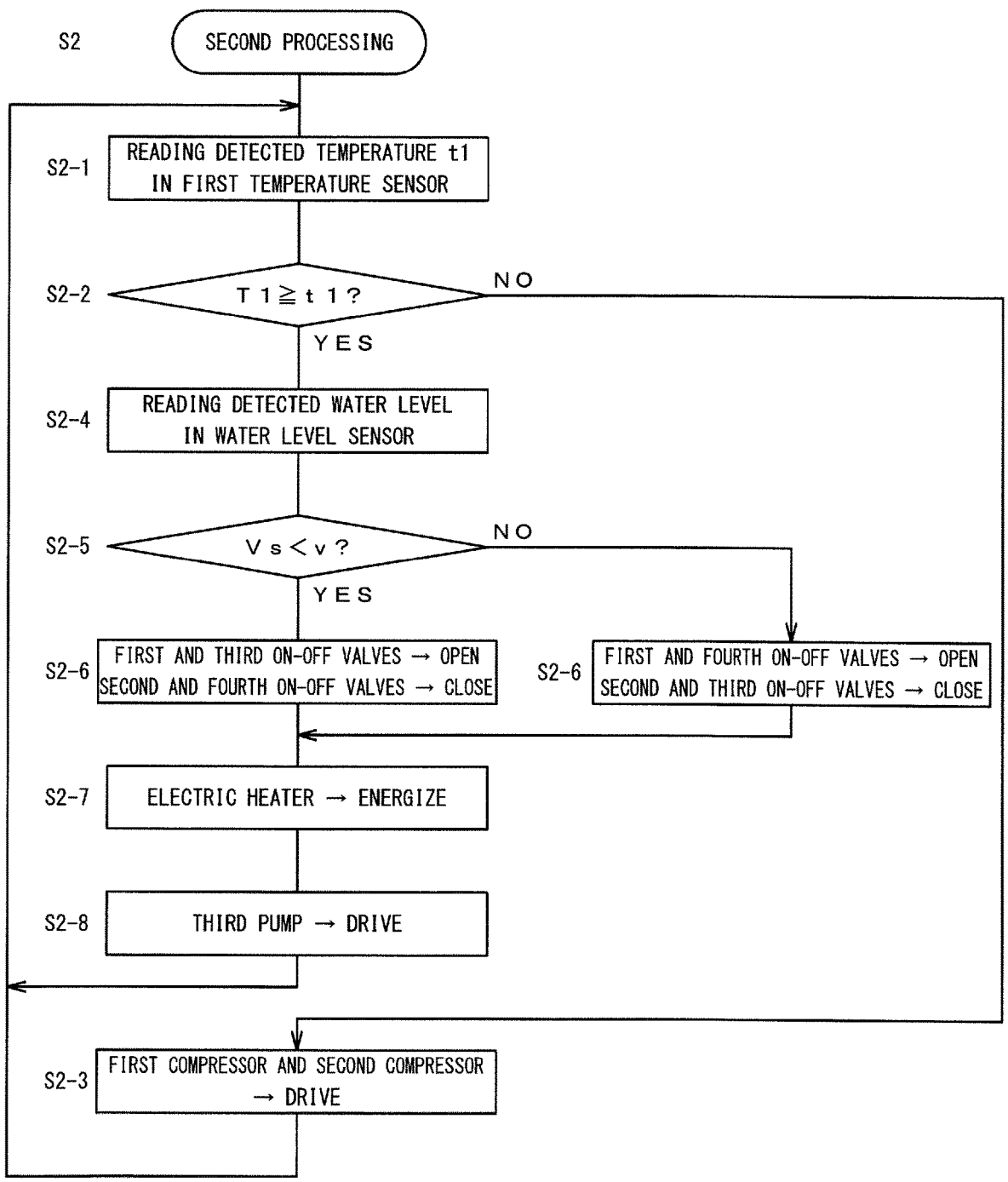
FIG. 4 is a flowchart showing second processing by the control device in FIG. 2.

As shown in FIG. 4, in the second processing, the process reads the temperature t1 of the heating medium in the first heat storage tank 10 by the first temperature detection sensor 21 (step S2-1), and determines whether the read heating medium temperature t1 is not more than a preset first set temperature T1 (step S2-2). If the heating medium temperature t1 exceeds the first set temperature T1, the process determines that a sufficient amount of heat can be given to the compressed air by the third heat exchanger 13 and the fourth heat exchanger 15, and starts the operation of the first expander 12 and the second expander 14 (step S2-3). Thus, the compressed air can be sufficiently heated, and expansion in the first expander 12 and the second expander 14 can be smoothly performed.

If the detected temperature t1 by the first temperature detection sensor 21 is not more than the first set temperature T1, the process reads the water level of the heating medium detected by the water level detection sensor 23 (step S2-4). Then, based on the read water level of the heating medium, the process calculates the volume v of the heating medium in the first heat storage tank 10, and determines whether the volume v exceeds the set volume Vs (step S2-5). If the process determines that the volume v of the heating medium exceeds the set volume Vs, the process opens the first on-off valve 29 and the third on-off valve 31, and closes the second on-off valve 30 and the fourth on-off valve 32 (step S2-6). Then, the process energizes the electric heater 28 (step S2-7), and starts driving of the third pump 27 (step S2-8). Thus, circulating the heating medium in the first heat storage tank 10 to forcibly heat the heating medium by the electric heater 28 makes it possible to sufficiently raise the temperature of the compressed air supplied to the first expander 12 and the second expander 14.

If determining that the volume v of the heating medium in the first heat storage tank 10 is not more than the set volume Vs (NO in step S2-5), the process opens the first on-off valve 29 and the fourth on-off valve 32 and closes the second on-off valve 30 and the third on-off valve 31 (step S2-9). Then, the process energizes the electric heater 28 (step S2-7), and starts driving of the third pump 27 (step S2-8). Thus, the heating medium in the second heat storage tank 11 can be heated by the electric heater 28 and supplied into the first heat storage tank 10. As a result, with sufficient volume and temperature of the heating medium in the first heat storage tank 10, the temperature of the compressed air supplied to the first expander 12 and the second expander 14 can be sufficiently raised as described above.

Thereafter, if the read heating medium temperature t1 exceeds the preset second temperature T1, the process starts driving of the first compressor 6 and the second compressor 8 (step S2-3). Since the flow of the heating medium is set in a good state, the load on the third pump 27 does not increase, and the distribution failure of the heating medium to each member or the like does not occur.

(Third Processing: Step S3)

Figure 5:
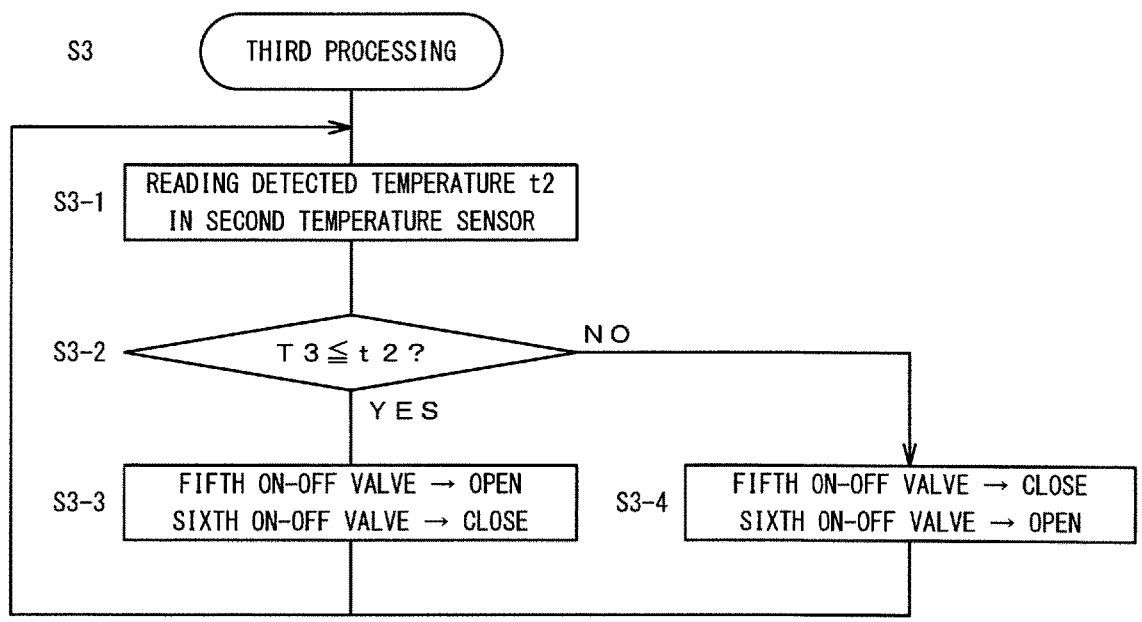
FIG. 5 is a flowchart showing third processing by the control device in FIG. 2.

As shown in FIG. 5, in the third processing, the process reads the detected temperature t2 by the second temperature detection sensor 23 (step S3-1), and determines whether the read detected temperature t2 is not less than a preset third set temperature T3 (step S3-2). If the detected temperature t2 is not less than the third set temperature T3, the process opens the fifth on-off valve 34 and closes the sixth on-off valve 37 (step S3-3). Then, driving the fourth pump 35 (step S3-4) makes it possible to cool the heating medium discharged from the second heat storage tank 11 with the cooling water cooler 33 and to prevent the heating medium from becoming excessively high temperature with the first compressor 6 and the second compressor 8. On the other hand, if the detected temperature t2 is less than the third set temperature T3 (NO in step S3-2), the process closes the fifth on-off valve 34 and opens the sixth on-off valve 37 (step S3-5). At this time, the fourth pump 35 is not driven. Thus, the heating medium in the second heat storage tank 11 at not so high temperature can be supplied as it is to the first compressor 6 and the second compressor 8, and normal operation can be performed.

The invention claimed is:

1. A compressed air energy storage power generation device comprising:
a compressor that compresses air;
a pressure accumulation unit that stores compressed air compressed by the compressor;
an expander driven by compressed air supplied from the pressure accumulation unit;
a generator mechanically connected to the expander;
a first heat exchanger that conducts heat exchange between a heating medium and the compressed air supplied from the compressor to the pressure accumulation unit so as to cool the compressed air and heat the heating medium;
a first heat storage unit that stores the heating medium heated by the first heat exchanger;
a second heat exchanger that conducts heat exchange between the compressed air supplied from the pressure accumulation unit to the expander and the heating medium supplied from the first heat storage unit so as to heat the compressed air and cool the heating medium;
a second heat storage unit that stores the heating medium cooled by the second heat exchanger to supply the heating medium to the first heat exchanger;
a first heating medium flow passage and a second heating medium flow passage that connects the first heat storage unit and the second heat storage unit;
a third heating medium flow passage that connects an intermediate portion of the first heating medium flow passage and an intermediate portion of the second heating medium flow passage;
a first on-off valve that opens and closes the first heating medium flow passage at a first region extending from the first heat storage unit to the third heating medium flow passage;
a second on-off valve that opens and closes the first heating medium flow passage at a second region extending from the second heat storage unit to the third heating medium flow passage;

a third on-off valve that opens and closes the second heating medium flow passage at a third region extending from the first heat storage unit to the third heating medium flow passage;

a fourth on-off valve that opens and closes the second heating medium flow passage at a fourth region extending from the second heat storage unit to the third heating medium flow passage;

a driving pump that is provided in the third heating medium flow passage, and flows the heating medium; and a heater that is provided in the third heating medium flow passage, and heats the heating medium passing therethrough.

2. The compressed air energy storage power generation device according to claim 1, further comprising:

a first temperature detector that detects a temperature of the heating medium stored in the first heat storage unit;

a second temperature detector that detects a temperature of the heating medium stored in the second heat storage unit;

a volume detector that detects a volume of the heating medium stored in the first heat storage unit; and a controller, wherein under a condition where a detected temperature by the second temperature detector is not more than a second set temperature, when a volume of the heating medium detected by the volume detector is not less than a set volume, and a temperature of the heating medium detected by the first temperature detector is not less than a first set temperature, the controller opens the second on-off valve and the third on-off valve, closes the first on-off valve and the fourth on-off valve, and drives the driving pump, thereby supplying the heating medium stored in the first heat storage unit to the second heat storage unit, and when the volume of the heating medium detected by the volume detector is less than the set volume, or the temperature of the heating medium detected by the first temperature detector is less than the first set temperature, the controller closes the first on-off valve and the third on-off valve, opens the second on-off valve and the fourth on-off valve, heats the heating medium by the heater, and drives the driving pump, thereby circulating the heating medium stored in the second heat storage unit.

3. The compressed air energy storage power generation device according to claim 1, further comprising:

a first temperature detector that detects a temperature of the heating medium stored in the first heat storage unit;

a volume detector that detects a volume of the heating medium stored in the first heat storage unit; and a controller, wherein, under a condition where a detected temperature in the first temperature detector is not more than a first set temperature, the controller determines whether a detected volume by the volume detector is not less than a set volume, when the controller determines that the detected volume by the volume detector is not less than the set volume, the controller opens the first on-off valve and the third on-off valve, closes the second on-off valve and the fourth on-off valve, heats the heating medium by the heater, and drives the driving pump, thereby circulating the heating medium stored in the first heat storage unit, and when the controller determines that the detected volume by the volume detector is less than the set volume, the controller opens the first on-off valve and the fourth on-off valve, closes the second on-off valve and the third on-off valve, heats the heating medium by the heater, and drives the driving pump, thereby supplying the heating medium stored in the second heat storage unit to the first heat storage unit.

4. The compressed air energy storage power generation device according to claim 1, further comprising:

a second temperature detector that detects a temperature of the heating medium stored in the second heat storage unit;

a cooler provided in a fourth heating medium flow passage from the second heat storage unit to the compressor, a bypass flow passage that bypasses the cooler; and a controller, wherein when a detected temperature by the second temperature detector is not less than a third set temperature, the controller causes the cooler to cool the heating medium stored in the second heat storage unit, and when the detected temperature by the second temperature detector is less than the third set temperature, the controller supplies the heating medium stored in the second heat storage unit via the bypass flow passage that bypasses the cooler.

* * * * *